(12) United States Patent
Kiwan et al.

(10) Patent No.: US 11,565,703 B1
(45) Date of Patent: Jan. 31, 2023

(54) SYSTEM AND METHOD FOR VEHICLE DRIVE-AWAY CONTROL

(71) Applicant: Ford Global Technologies, LLC, Dearborn, MI (US)

(72) Inventors: Rani Kiwan, Canton, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/648,844

(22) Filed: Jan. 25, 2022

(51) Int. Cl.
*B60W 30/192* (2012.01)
*B60W 10/02* (2006.01)
*B60W 10/11* (2012.01)
*B60W 10/06* (2006.01)
*F02D 41/02* (2006.01)

(52) U.S. Cl.
CPC .......... *B60W 30/192* (2013.01); *B60W 10/02* (2013.01); *B60W 10/06* (2013.01); *B60W 10/11* (2013.01); *F02D 41/0235* (2013.01); *B60W 2510/0208* (2013.01); *B60W 2510/068* (2013.01); *B60W 2510/0638* (2013.01); *B60W 2510/0676* (2013.01); *B60W 2710/021* (2013.01); *B60W 2710/0644* (2013.01); *B60W 2710/1005* (2013.01); *F02D 2200/021* (2013.01); *F02D 2200/0804* (2013.01)

(58) Field of Classification Search
CPC ...... B60W 10/02; B60W 10/06; B60W 10/11; B60W 30/192; B60W 2510/0208; B60W 2510/0638; B60W 2510/0676; B60W 2510/068; B60W 2710/021; B60W 2710/0644; B60W 2710/1005; F02D 41/0235; F02D 2200/021; F02D 2200/0804
See application file for complete search history.

(56) References Cited

U.S. PATENT DOCUMENTS

| 8,863,870 B2 | 10/2014 | Gwozdek et al. | |
|---|---|---|---|
| 9,145,123 B2 | 9/2015 | Doering et al. | |
| 9,561,798 B2 * | 2/2017 | Jerger | B60W 30/18 |
| 10,086,807 B2 | 10/2018 | Gottlieb et al. | |
| 10,836,397 B1 | 11/2020 | Christensen et al. | |
| 2003/0232696 A1 * | 12/2003 | Shibagaki | B60W 10/06 477/76 |
| 2020/0180630 A1 * | 6/2020 | Kaneko | F01N 3/2093 |
| 2021/0355852 A1 * | 11/2021 | Bellinger | B60W 50/0097 |

FOREIGN PATENT DOCUMENTS

DE 102020208718 B3 9/2021

* cited by examiner

*Primary Examiner* — Edwin A Young
(74) *Attorney, Agent, or Firm* — Vincent Mastrogiacomo; McCoy Russell LLP

(57) ABSTRACT

Methods and systems are provided for controlling a vehicle including a manual transmission to prevent cold-start drive-away. In one example, a method for a vehicle with a driver clutch pedal may include preventing one of a clutch coupled between an input of a transmission and an engine output from closing and a driver-operated gearshift lever for adjusting a gear of the transmission from coming out of neutral in response to a catalyst light-off condition.

20 Claims, 8 Drawing Sheets

SYSTEM AND METHOD FOR VEHICLE DRIVE-AWAY CONTROL

FIELD

The present description relates generally to methods and systems for controlling a vehicle engine to prevent cold-start drive-away.

BACKGROUND/SUMMARY

Engine emission control systems may include one or more exhaust catalysts such as three-way catalysts, NOx storage catalysts, and SCR catalysts. At catalyst light-off temperature (e.g., operational temperature where the catalytic activity is sufficiently activated to convert regulated emissions), the exhaust catalyst may oxidize and/or reduce exhaust constituents in an exhaust gas. However, during a cold-start of an engine, when a temperature of the exhaust catalyst is below the light-off temperature, the exhaust catalyst may not be able to effectively treat one or more of the regulated constituents of the exhaust gas, and as a result, cold-start emissions may increase. For example, during a cold-start, a portion of liquid fuel injected to the cylinders may not be combusted and such unburned hydrocarbons may contribute to the increased cold-start emissions.

One way to reduce cold-start emissions is to reduce engine load during catalyst warming. However, reducing engine load may still produce more emissions compared to engine idling, for example, while the vehicle is stationary, due to higher fuel consumption. Another way to reduce cold-start emissions is to prevent drive-away until the catalyst reaches the light-off temperature. For vehicles with automatic transmissions, preventing drive-away may be achieved with a software change, for example by operating a braking device of a drivetrain with an automatic gearbox and/or keeping the automatic transmission in a neutral state until one or more operating conditions are met. However, the inventors herein have recognized such approaches are inapplicable for vehicles with a manual transmission.

In one example, a method for a vehicle with a driver clutch pedal may include preventing one of a clutch coupled between an input of a transmission and an engine output from closing and a driver-operated gearshift lever for adjusting a gear of the transmission from coming out of neutral in response to a catalyst light-off condition. In this way, cold-start drive-away is prevented until catalyst activity is sufficiently activated.

As another example, a method for a vehicle may include preventing the clutch coupled between the input of the transmission and the engine output from closing, wherein the clutch is not coupled to a driver-operated clutch pedal and an electric actuator is coupled to the clutch. In such an example, the actuator may be adjusted to follow the driver-operated clutch pedal after reaching catalyst light-off. In an example, a method for a vehicle with a driver clutch pedal may include preventing the clutch coupled between the input of the transmission and an engine output from closing by engaging a clutch lock to lock the clutch in an open position until after reaching catalyst light-off. In another example, a method for a vehicle with a driver clutch pedal may further include engaging a gearshift lever lock to lock the gearshift lever in neutral until after reaching catalyst light-off.

In another example, a method for a vehicle may include controlling engine speed to a desired engine speed during idling before reaching catalyst light-off with a first feedback control parameter, and controlling engine speed to the desired engine speed during idling after reaching catalyst light-off with a second feedback control parameter different from the first. Before catalyst light-off is reached, desired engine idle speed may be set based on at least engine temperature. After reaching catalyst light-off, the desired engine idle speed may be reduced as compared with engine idle speed before reaching catalyst light-off, and the feedback control parameter and the desired engine idle speed may be gradually changed when transitioning around catalyst light-off.

In this way, by preventing drive-away during a cold start and adjusting engine idle speed control based on the catalyst light-off condition, heat from the warming engine may be directed to warming the catalyst. By warming the catalyst to light-off temperature before drive-away is allowed, emissions of unburned hydrocarbon are reduced, exhaust may be effectively treated sooner, and reduced cold-start emissions on vehicles equipped with manual transmissions is achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
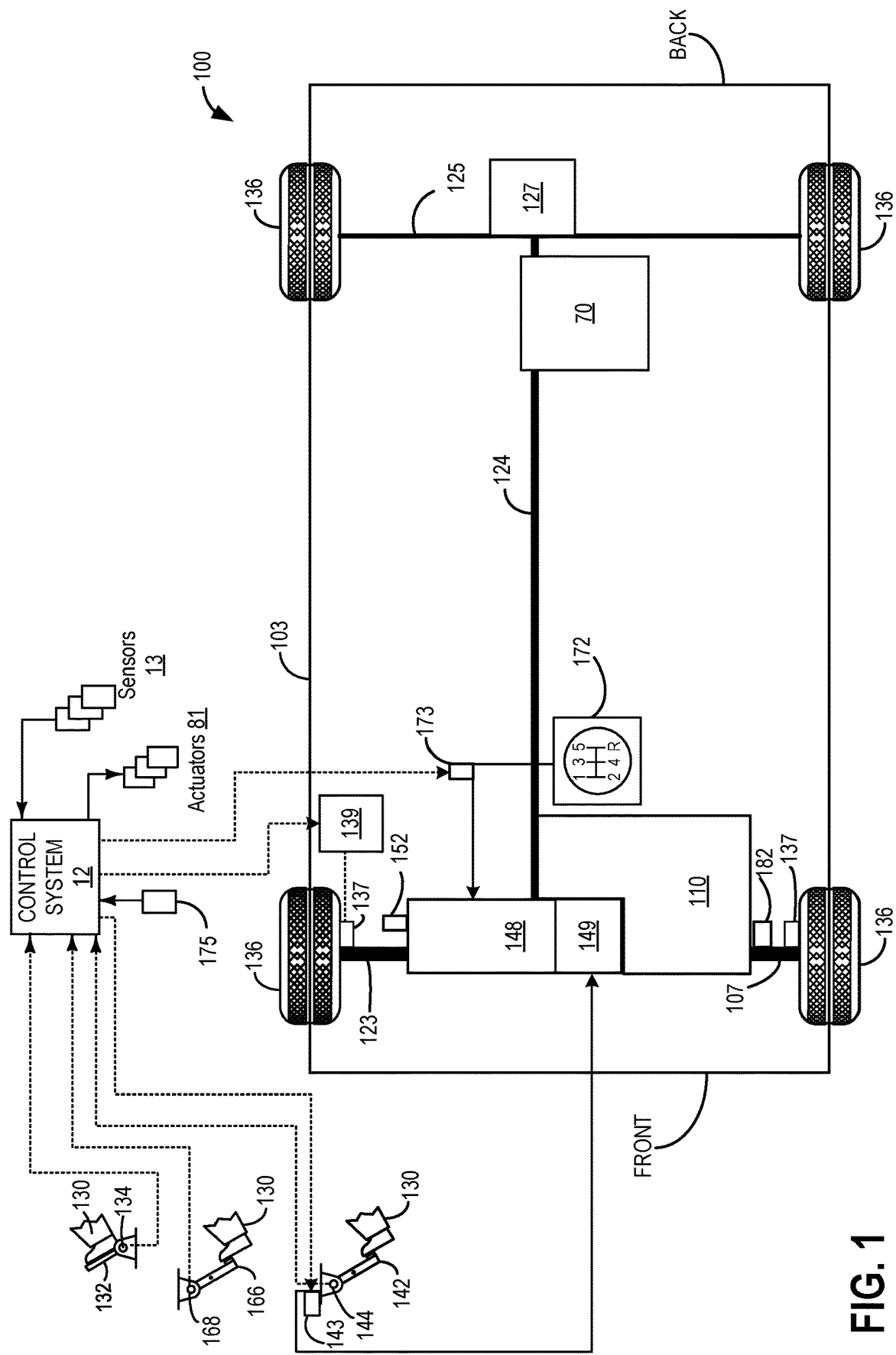
FIG. 1 is a schematic diagram of a vehicle system having a manual transmission including a cold-start drive-away control system, particularly wherein a clutch is coupled to a driver-operated clutch pedal.
Figure 4:
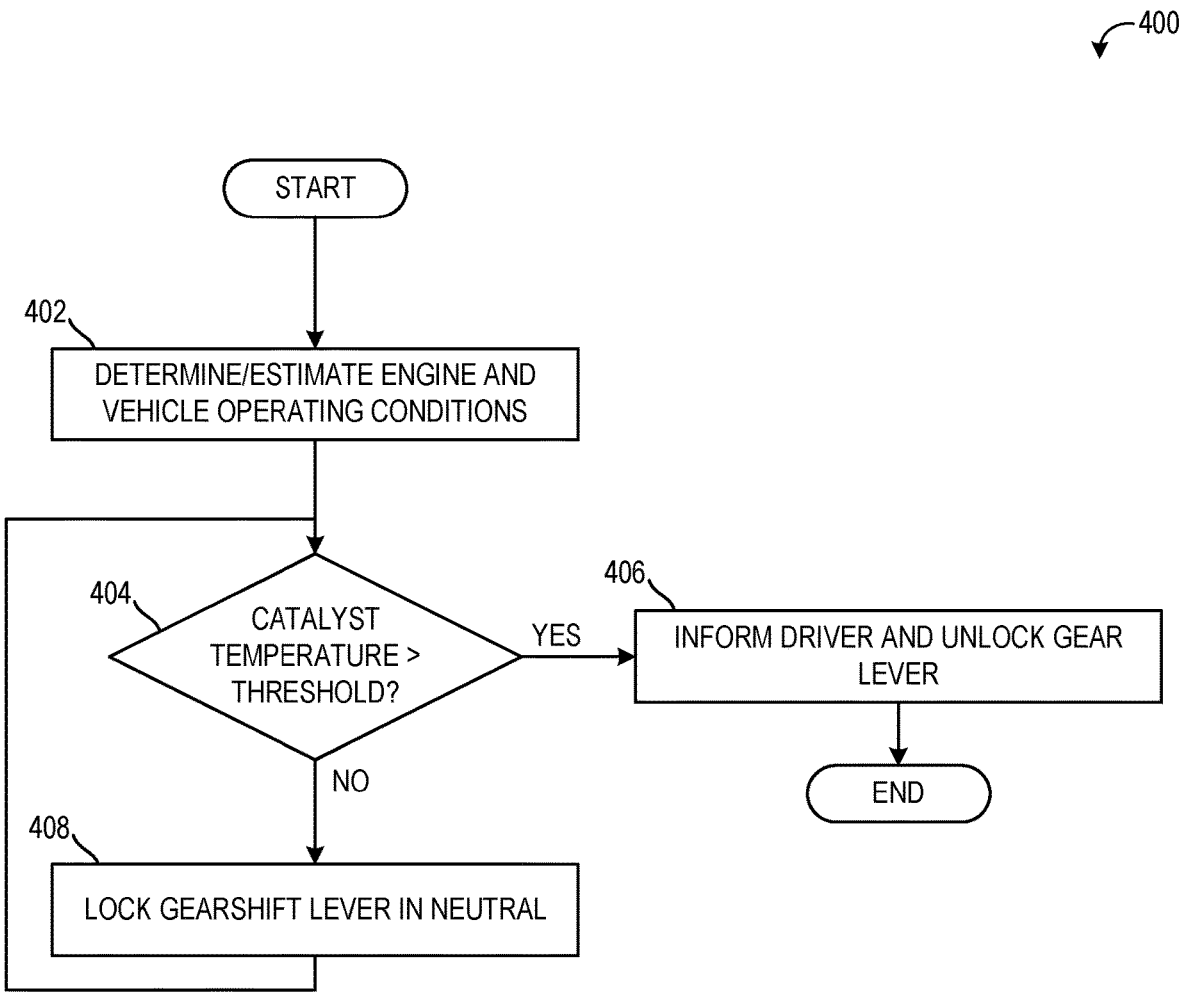
FIG. 4 is a flow chart illustrating a method for controlling a vehicle during a cold-start including a mechanism to lock a driver-operated gearshift lever.
Figure 5:
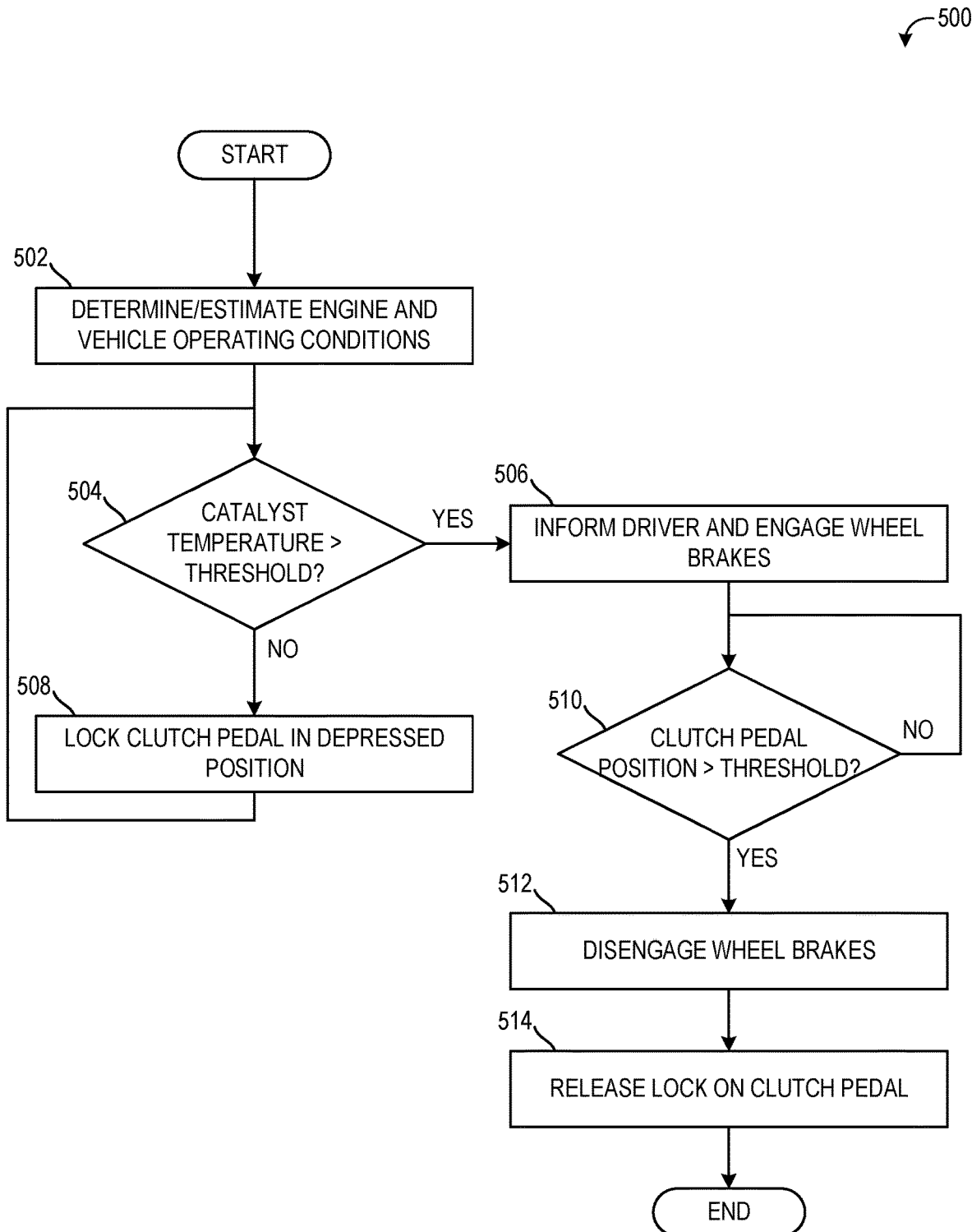
FIG. 5 is a flow chart illustrating a method for controlling a vehicle during a cold-start including a mechanism to lock a clutch pedal.
Figure 6:
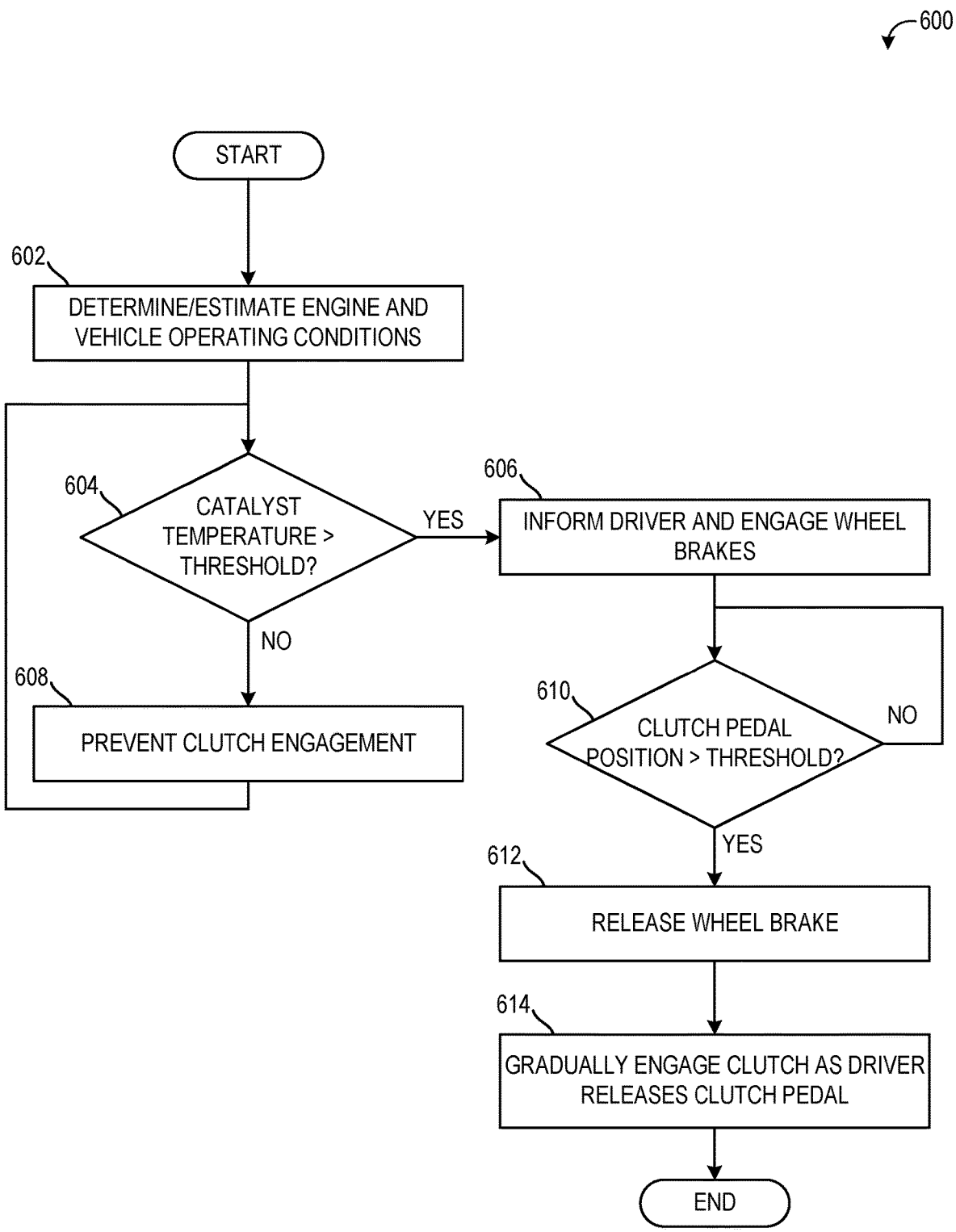
FIG. 6 is a flow chart illustrating a method for controlling a vehicle during a cold-start including an electric clutch actuator.
Figure 7:
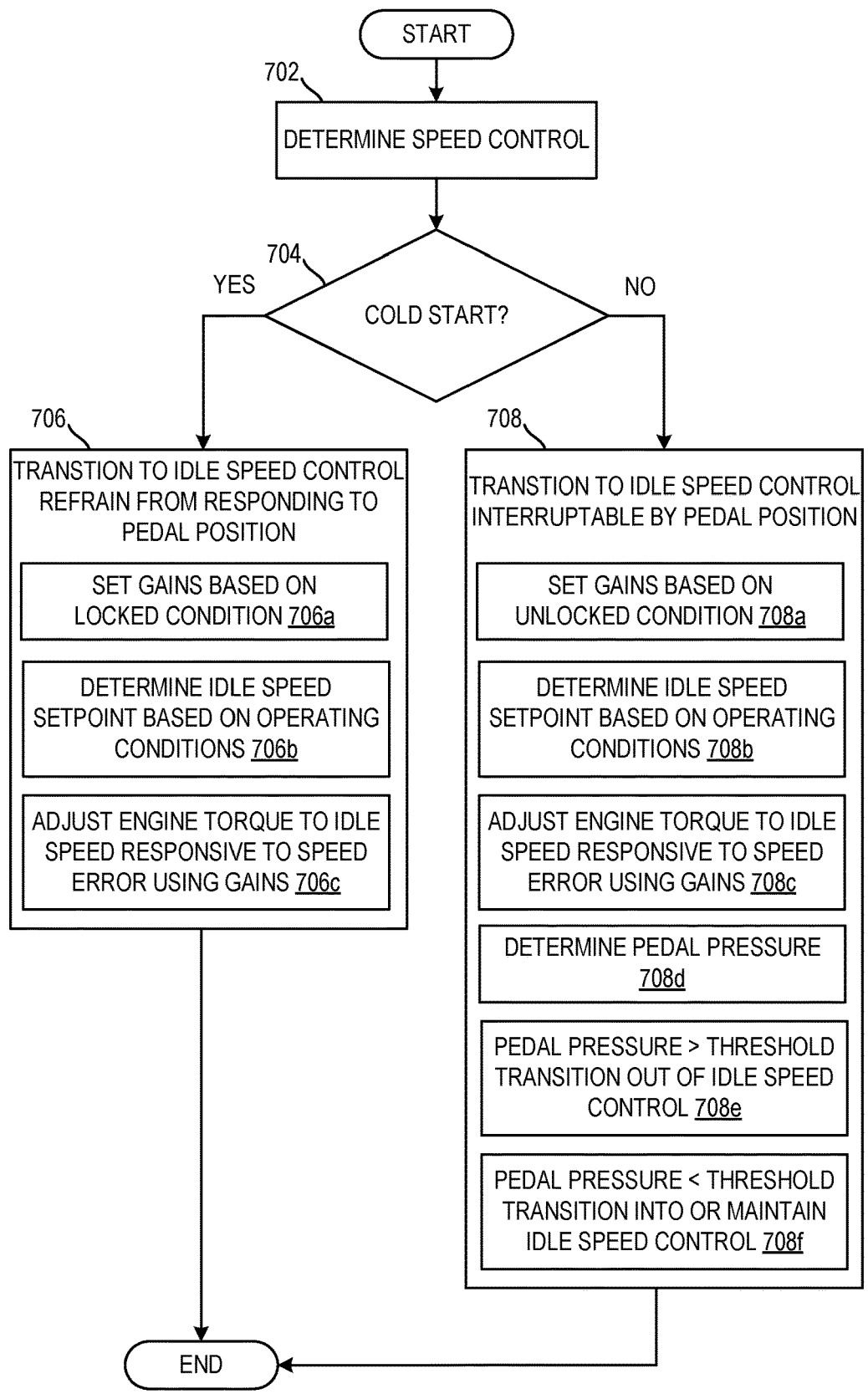
FIG. 7 is a flow chart illustrating a method for idle speed control of a vehicle with a manual transmission.
Figure 8:
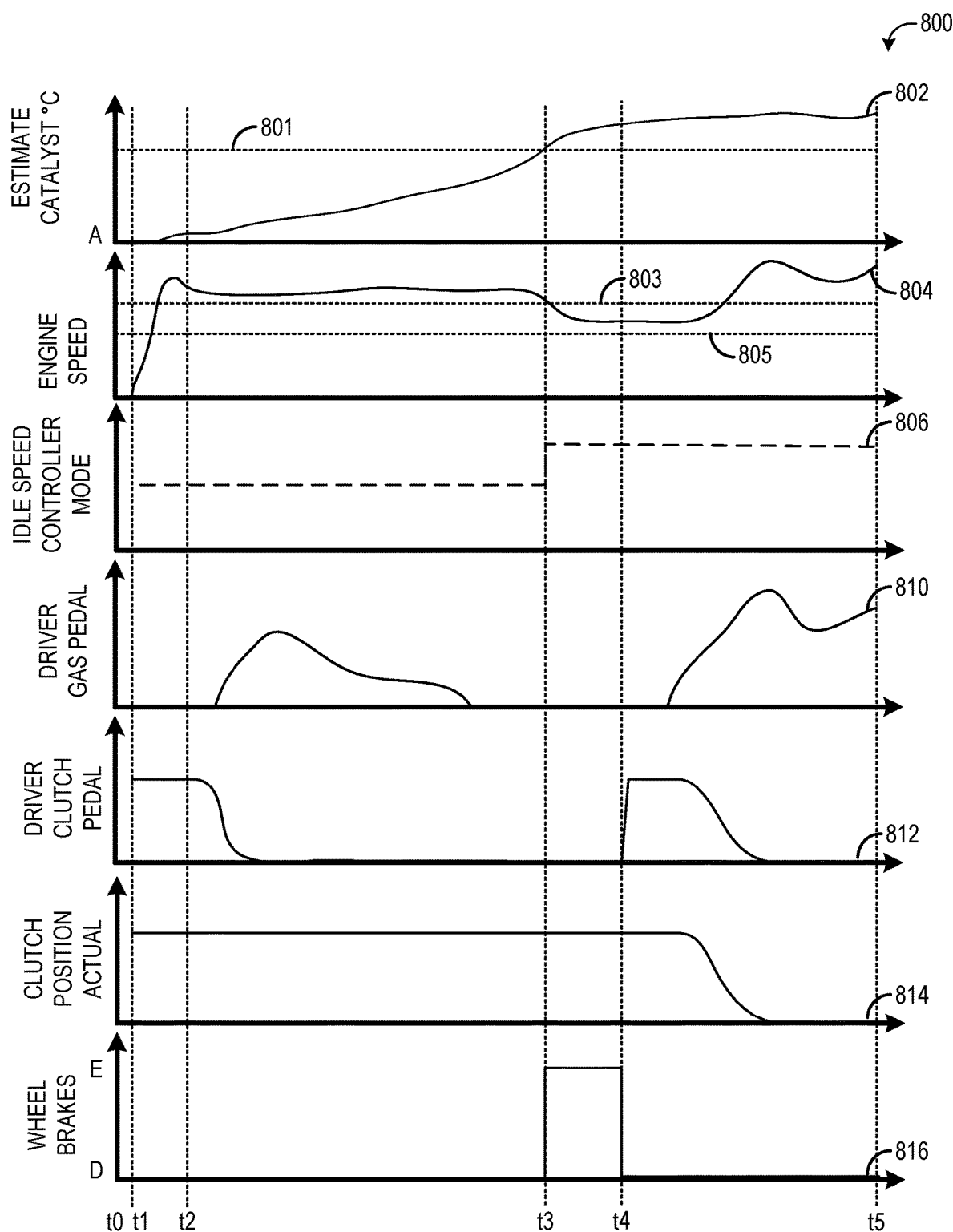
FIG. 8 is a timing diagram for an example prophetic operation of a cold-start drive-away prevention system in a vehicle with a manual transmission.

The following description relates to systems and methods for cold-start drive-away control in a vehicle system with a manual transmission. In one example, the system may include an electromechanical locking mechanism for preventing drive-away until sufficient warming of one or more exhaust catalysts of an emissions control device is indicated, such as by reaching a catalyst light-off temperature. FIG. 1 shows an example vehicle system including a clutch coupled between an input of a transmission and an engine output. In the embodiment of FIG. 1, cold-start drive-away control may include use of a gearshift lever lock for locking a driver-operated gearshift lever in neutral. FIG. 1 also shows an additional or alternative mechanism for locking the clutch in an open position until after reaching catalyst light-off temperature. In another embodiment, a system for cold-start drive-away control may include a clutch not coupled to a driver-operated clutch pedal, such that the driver-operated clutch pedal may be operated by an electric actuator coupled to the clutch and the actuator adjusted to follow the driver-operated clutch pedal after reaching catalyst light off. Such an electric actuated clutch system is shown as part of the vehicle system illustrated in FIG. 2. Preventing cold-start drive-away may include operational control of an engine system, such as the engine system of FIG. 3. A controller may be configured to perform a routine, such as shown in FIG. 4, for preventing cold-start drive-away by operating a gearshift lever lock based on one or more engine operating conditions. The controller may be configured to perform an additional or alternative routine, such as shown in FIG. 5, for preventing cold-start drive-away including engaging a clutch lock to lock the clutch in an open position based on one or more operating conditions. The controller may be configured to perform an additional or alternative routine, such as shown in FIG. 6, for preventing cold-start drive-away in a vehicle wherein the clutch is not coupled to a driver-operated clutch pedal by operating an electric actuator coupled to the clutch based on one or more operating conditions. In some examples, a method for preventing cold-start drive-away may include idle speed control of the engine based on one or more engine operating conditions, such as illustrated in FIG. 7. As an example, the routines of FIG. 7 and one of FIGS. 4-6 may be carried out together in parallel. A timing diagram for an example prophetic operation of a cold-start drive-away prevention system in a vehicle with a manual transmission is illustrated in FIG. 8.

FIG. 1 schematically depicts an example vehicle 100 as shown from a top view. Vehicle 100 includes a vehicle body 103 with a front end, labeled "FRONT", and a back end labeled "BACK." Vehicle 100 may include a plurality of wheels 136. For example, as shown in FIG. 1, vehicle 100 may include a first pair of wheels adjacent to the front end of the vehicle and a second pair of wheels adjacent the back end of the vehicle.

Vehicle 100 includes a prime mover. In one example, the prime mover may be a fuel burning, reciprocating piston, internal combustion engine 110 coupled to transmission 148. Vehicle 100 is also depicted as having a FWD transmission where engine 110 drives the front wheels via half shafts 107 and 123. In another embodiment, vehicle 100 may have a RWD transmission that drives the rear wheels via a driveshaft 124 and a differential 127 located on rear axle 125.

Transmission 148, in the example of FIG. 1, is a manual transmission having a number of selectable gears. A driver operable input device in the form of a gearshift lever 172 is provided to permit an operator 130 (e.g., a driver) of the vehicle 100 to select a desired gear of the transmission 148. In one example, the gearshift lever 172 may be mechanically linked to the transmission. In another example, the gearshift lever may not be mechanically linked. Instead, gearshift lever position may be read by a sensor. The gearshift lever position may indicate a selected gear of the transmission to the control system. Upon receiving the gear selection signal, the control system then signals to an actuator of the transmission to engage the selected gear. A clutch 149 may be interposed between the output of engine 110 and the input of transmission 148 to allow the transmission 148 to be disengaged from the engine 110 when clutch pedal 142 is depressed by operator 130. The clutch 149 may have engaged and disengaged states, and may be controlled by the operator 130 using a clutch pedal 142.

Engine 110 may be controlled at least partially by a control system including controller 12 and by input from an operator 130 via one or more input devices. Controller 12 may also be termed electronic controller 12. In this example, an input device includes an accelerator pedal 132 and an accelerator pedal sensor 134. The accelerator pedal sensor 134 may provide an input indicative of whether the accelerator pedal 132 of the vehicle 100 is being pressed or not. If the accelerator pedal 132 is pressed, a torque demand for the engine 110 may be generated, and when the accelerator pedal 132 is not pressed but is released then the engine 110 may be in an idle mode. It will be appreciated that fueling and general running of the engine 110 may be controlled by controller 12.

The controller 12 may also receive input from the driver via the clutch pedal 142 and clutch pedal sensor 144. As an example, the clutch pedal sensor 144 may sense a position of the clutch pedal 142. In one example, the clutch pedal sensor 144 may be a linear displacement sensor; however, other clutch pedal sensors may be applicable. In one example, the position of the clutch pedal 142 determines an engagement state of the clutch. However, it will be appreciated that instead of sensing clutch pedal position, other methods could be used to monitor and provide a feedback of clutch engagement state.

The vehicle 100 has a braking system 139 including a plurality of road wheel brakes 137 (referred to herein as wheel brakes 137) and a brake pedal 166 operable by the operator 130 to apply or release the road wheel brakes. The braking system 139 may be an automatic system, and in other examples, the braking system 139 may be a manual system or an electronic system. In an example, a brake pedal sensor 168 (e.g., a linear displacement sensor) senses a position of the brake pedal and the controller 12 applies the wheel brakes 137 in proportion to the sensed position. When the brake pedal 166 is pressed, the wheel brakes 137 are applied, and when the brake pedal 166 is released, the wheel brakes 137 are not applied. It will be appreciated that the brake pedal sensor 168 may not sense actual brake pedal position but pedal position could be inferred from, for example, the pressure of hydraulic fluid in the braking system.

An input to controller 12 may include a transmission state sensor 152, which provides a signal indicative of the engagement state of the transmission 148. The transmission may include two operating states: a driving state when one of the gears of the transmission is in an in-gear condition which is referred to as a transmission engaged state, and a non-driving state when none of the gears of the transmission are in-gear which is referred to as a transmission neutral state. The transmission state sensor 152 can either sense when the transmission is in the engaged state or when it is in the neutral state or there can be additional sensors for sensing both states for corroboration purposes.

An input to controller 12 may be from a vehicle speed sensor 182, which can be of any convenient form but in this case is a road wheel rotation sensor (vehicle speed sensor) formed as part of an anti-lock mechanism of the braking system 139 of the vehicle 100. An input to controller 12 may be from an engine start/stop button 175. For example, while the clutch pedal 142 is held in a depressed state, selecting the engine start/stop button 175 may indicate to the controller 12 to start or stop the engine 110. An additional input may include any additional input involved in control of the stopping and starting of the engine 110, for example inputs for indicating that one or more stop inhibitors are present. For example, stop inhibitors could be climate control system, a desired battery state of charge, or a desired engine temperature.

In alternative examples, a separate controller in addition to controller 12 may be used to receive inputs from the clutch pedal sensor, the brake pedal sensor, the accelerator pedal sensor, the transmission sensor, and vehicle speed sensor. In the example shown in FIG. 1, controller 12 may receive all signals used to determine engine stop-start and operation of vehicle 100. In addition to the inputs described above, controller 12 may receive sensory feedback information from a variety of sensors 13, which may include information such as ambient temperature and pressure, manifold pressure, air-fuel ratio, engine temperature, exhaust temperature, etc. In response to information received from sensors 13, controller 12 may send control signals to a variety of actuators 81 such as fuel injectors, throttle plate, etc.

The controller 12 may continuously monitor motion of the vehicle 100 via the vehicle speed sensor 182, the states of the clutch pedal 142 and the brake pedal 166 via their respective clutch pedal sensor 144 and brake pedal sensor 168, and the state of the transmission via the transmission state sensor 152.

Vehicle 100 may include a mechanism for preventing cold-start drive-away. One mechanism, presented in example FIG. 1, is preventing the driver-operated gearshift lever mechanically linked to the transmission from shifting out of neutral. In an example embodiment of vehicle 100, the transmission 148 and gearshift lever 172 are shifted into neutral in order for the engine 110 to start. Once in neutral, the transmission 148 and gearshift lever 172 may be locked until an emissions control device, such as exhaust catalyst 70, has reached catalyst light-off temperature (e.g., typically around 400 to 600° F.). In one example, the gearshift lever 172 may be locked into the neutral position using a mechanical locking mechanism, such as a gearshift lever lock 173. As an example, the gearshift lever lock 173 may be an electrically actuated mechanical pin. When the engine 110 is ignited, exhaust from ignition of the engine 110 heats the exhaust catalyst 70. One or more of the sensors 13 (e.g., an exhaust temperature sensor) of the vehicle 100 may signal to controller 12 a temperature estimate of the exhaust catalyst 70. Once the exhaust catalyst 70 reaches light-off temperature (e.g., catalyst full efficiency), the controller 12 may unlock the gearshift lever lock 173. Once the gearshift lever lock 173 is unlocked, the gearshift lever 172 may be operated by the driver, allowing for the transmission 148 to be shifted into different gears, such as reverse, first gear, etc.

Continuing with FIG. 1, in another example, vehicle 100 may include a mechanism for preventing the clutch 149 from closing using a clutch pedal lock 143 coupled to the clutch pedal 142 and the clutch pedal sensor 144. The clutch pedal lock 143 may be an electrically controlled latch mechanism. In another example, the clutch pedal lock 143 may be an electrically actuated mechanical pin. In one example, the driver may depress the clutch pedal 142 before engine start is allowed. In one example, with the clutch pedal 142 held in a depressed state, a driver request to start the engine 110 via engine start/stop button 175 may be indicated to the controller 12. The controller 12 detects the clutch 149 has been disengaged and the engine 110 has been started. The pedal lock 143 holds the clutch pedal in the depressed position maintaining the clutch in a disengaged state. The controller 12 then sends a response back to the clutch pedal lock 143 whether or not the temperature the catalyst light-off temperature has been reached. The controller maintains (e.g., holds in place) the clutch pedal lock 143 of the clutch pedal 142 until light-off temperature has been achieved in the exhaust catalyst 70.

In one example, once the exhaust catalyst reaches light-off temperature, the controller 12 may not immediately (electronically) release the clutch pedal lock 143. Releasing the clutch pedal lock 143 without first prompting the driver may result in vehicle motion if the transmission 148 is in an engaged state. One or more mechanisms may be included to reduce unintended vehicle movement. As an example, the driver may be informed when drive-away is allowed, e.g., when catalyst light-off temperature is achieved. As an example, the driver may be prompted to further depress the clutch pedal 142 to release the clutch pedal lock 143. As an example, unlocking may not occur until the clutch pedal sensor 144 detects the clutch pedal position has moved far enough to unlatch the clutch pedal lock 143. As another example, the clutch pedal sensor 144 may be used instead to ensure the driver is engaging the clutch pedal 142 sufficiently before the clutch pedal lock 143 is electronically released. As an example, the brake pedal sensor 168 may be automatically engaged by the clutch pedal lock 143 to signal to the controller 12 to engage the wheel brakes 137. The wheel brakes 137 may be engaged during catalyst warm up, even if the driver is not pressing the brake pedal, and maintained until an indication is received from the driver.

Figure 2:
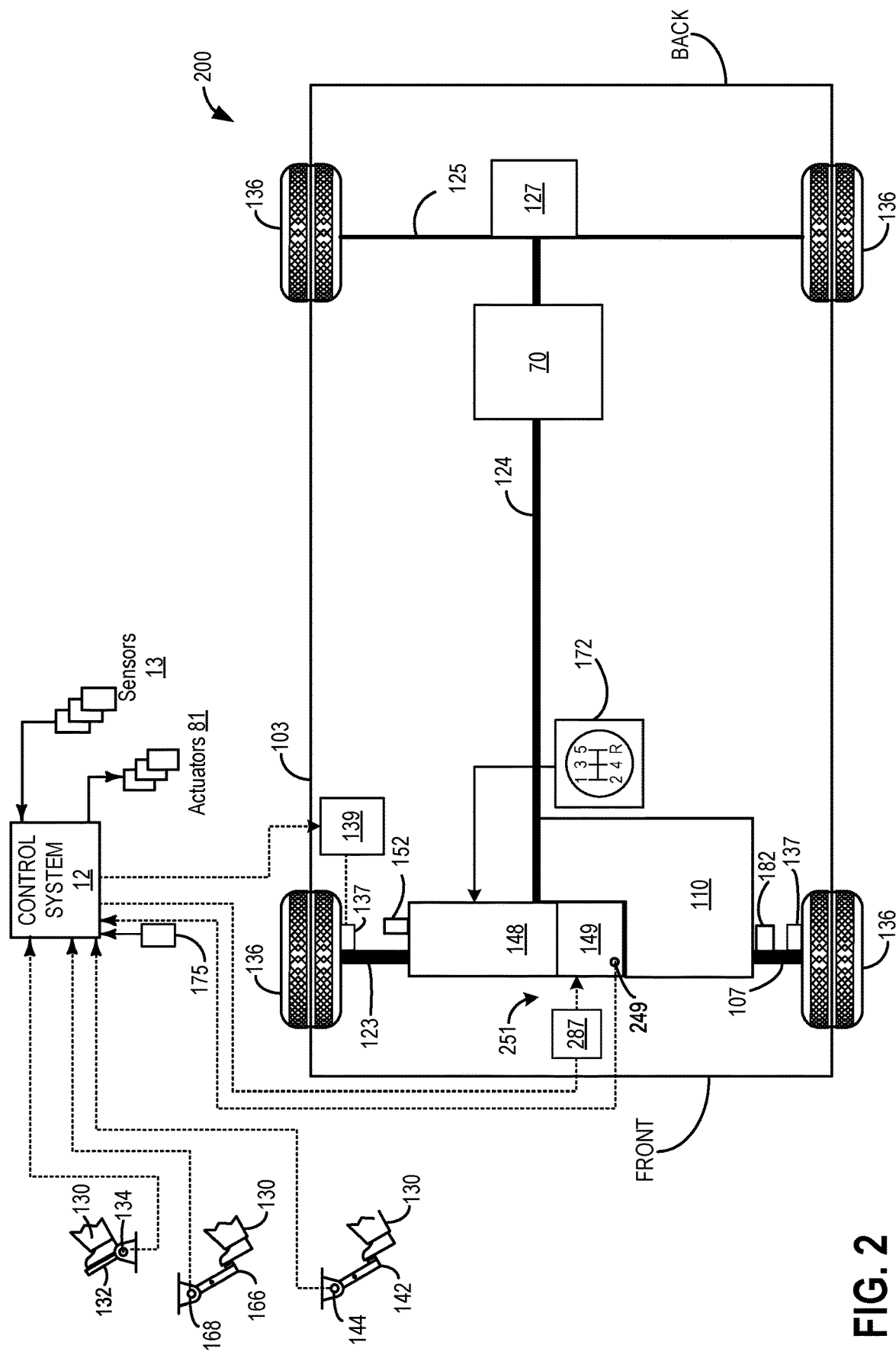
FIG. 2 is a schematic diagram of a vehicle system having a manual transmission including drive-away control system, particularly wherein a clutch is not coupled to a driver-operated clutch pedal and an electric clutch actuator is coupled to the clutch.

Turning now to FIG. 2, a schematic diagram is shown illustrating a vehicle 200 including an embodiment of a clutch system 251 for cold-start drive-away control, wherein the clutch is not mechanically coupled to a driver-operated clutch pedal. Elements in common between FIG. 1 and FIG. 2 are labeled similarly. For example, vehicle 200 of FIG. 2 includes the engine 110, the transmission 148, the clutch 149, the driver-operated clutch pedal 142, and the differential 127. Vehicle 200 includes the controller 12, one or more sensors 13, and one or more actuators 81. In one example, the vehicle 200 may include accelerator pedal sensor 134, braking system 139, brake pedal sensor 168, vehicle speed sensor 182, and transmission state sensor 152. In response to information received from the various sensors of the vehicle, the controller 12 may send control signals to the one or more actuators 81, such as fuel injectors, throttle plate, etc. The clutch system 251 includes an electric clutch actuator 287 coupled to the clutch 149. In another example, the clutch actuator may be a hydraulic clutch actuator. The clutch system 251 includes a clutch sensor 249 coupled to the clutch 149. The clutch sensor 249 follows the position of the clutch 149 for providing clutch position feedback (e.g., a slave) to the controller 12. Driver operated clutch pedal 142 includes a clutch pedal sensor 144 for detecting a pedal position. In one example, the electric clutch actuator 287 controls engagement of the clutch 149 responsive to a position of the clutch pedal 142 communicated to the controller 12 via the clutch pedal sensor 144.

In one example, the controller 12 may operate the clutch system 251 to prevent engagement of the clutch 149 before the catalyst light-off temperature is reached. As an example, the operator 130 presses the clutch pedal 142 and the clutch pedal sensor 144 sends a signal to the controller 12. The operator 130 shifts the gearshift lever 172 and transmission 148 into neutral then presses the start/stop button 175 to start the engine 110. When the engine 110 starts, the control system sends a signal preventing electric clutch actuator 287 from engaging the clutch 149. With the clutch 149 engagement prevented, the engine 110 heats the exhaust catalyst 70. One or more sensors 13 signals to the controller 12 an estimated catalyst temperature as the exhaust catalyst 70 warms. Once the exhaust catalyst 70 reaches light-off temperature, the controller 12 sends a command to the electric clutch actuator 287 to follow the driver operated clutch pedal 142.

Continuing with the example in FIG. 2, upon the exhaust catalyst 70 reaching light-off temperature, the electric clutch actuator 287 may not immediately engage the clutch 149. For example, the controller 12 may engage wheel brakes 137 to reduce movement until an indication is received from the operator 130. In one example, the wheel brakes 137 may be engaged based on the catalyst light-off condition. In another example, the wheel brakes 137 may be engaged while the clutch 149 is locked and during catalyst warming. As another example, the wheel brakes 137 may be engaged after catalyst light-off temperature is reached but before driver clutch control is restored and maintained until an indication from the driver is received. Once catalyst light-off temperature is reached and the electric clutch actuator 287 allows the clutch 149 to be adjusted responsive to driver input, the controller 12 sends a message to a vehicle interface (e.g., display device 135 in FIG. 3) informing the operator 130 (e.g., driver, vehicle occupant) that they are able to drive. In an example, if the operator 130 is depressing the clutch pedal 142, then the clutch 149 will be engaged gradually as the driver gradually releases the clutch pedal 142. If the operator 130 is not depressing the clutch pedal 142, then the driver may be asked on the vehicle interface or mobile device to first depress then release the pedal to engage the clutch 149. As an example, once the controller 12 receives the indication from the operator 130 (e.g., via the clutch pedal sensor) the controller may disengage the wheel brakes.

As another example, estimated catalyst temperature, clutch lock-out status, and/or operating instructions may be indicated to the driver by providing a message on a mobile device via a vehicle communication system. For example, a processor and mobile device connection of the vehicle may send a message to the phone of the vehicle occupant or a phone linked to the vehicle. An additional benefit of operating a clutch with an electric clutch actuator, such as described in FIG. 2, is enabling remote start on vehicles equipped with a manual transmission. For example, remote start may be operated to pre-warm the engine and the catalyst, and the driver may alerted via phone message once catalyst light-off is achieved and the vehicle is operable. As another example, an estimate catalyst warmup time may be provided to the driver upon engine startup. In one example, a catalyst warmup time estimate may be based on an estimate catalyst temperature and a model of catalyst warmup based on operating conditions such as a current estimated catalyst temperature and ambient conditions.

A further advantage of an electric actuator is allowing for customizable clutch biting point location and smoothness. In one example, clutch biting point location may be adjusted based on driver preferences or driving modes (e.g., idle, sport, comfort, and city). Such customization may be beneficial, for example, to select a smooth gradual transition from disengaged clutch to engaged clutch while driving in traffic minimizing driver effort to achieve a smooth and comfortable drive (e.g., comfort mode). A sport mode may use a less gradual transition enabling faster shifts and more driver involvement.

In additional or alternative embodiments, controller maintenance of wheel brakes during catalyst warm up, estimated catalyst temperature, clutch lock-out status, and/or operating instructions communicated to the vehicle driver (e.g., via mobile, vehicle interface), as described with respect to FIG. 2, may be included in similar systems such as the examples described in FIG. 1.

Figure 3:
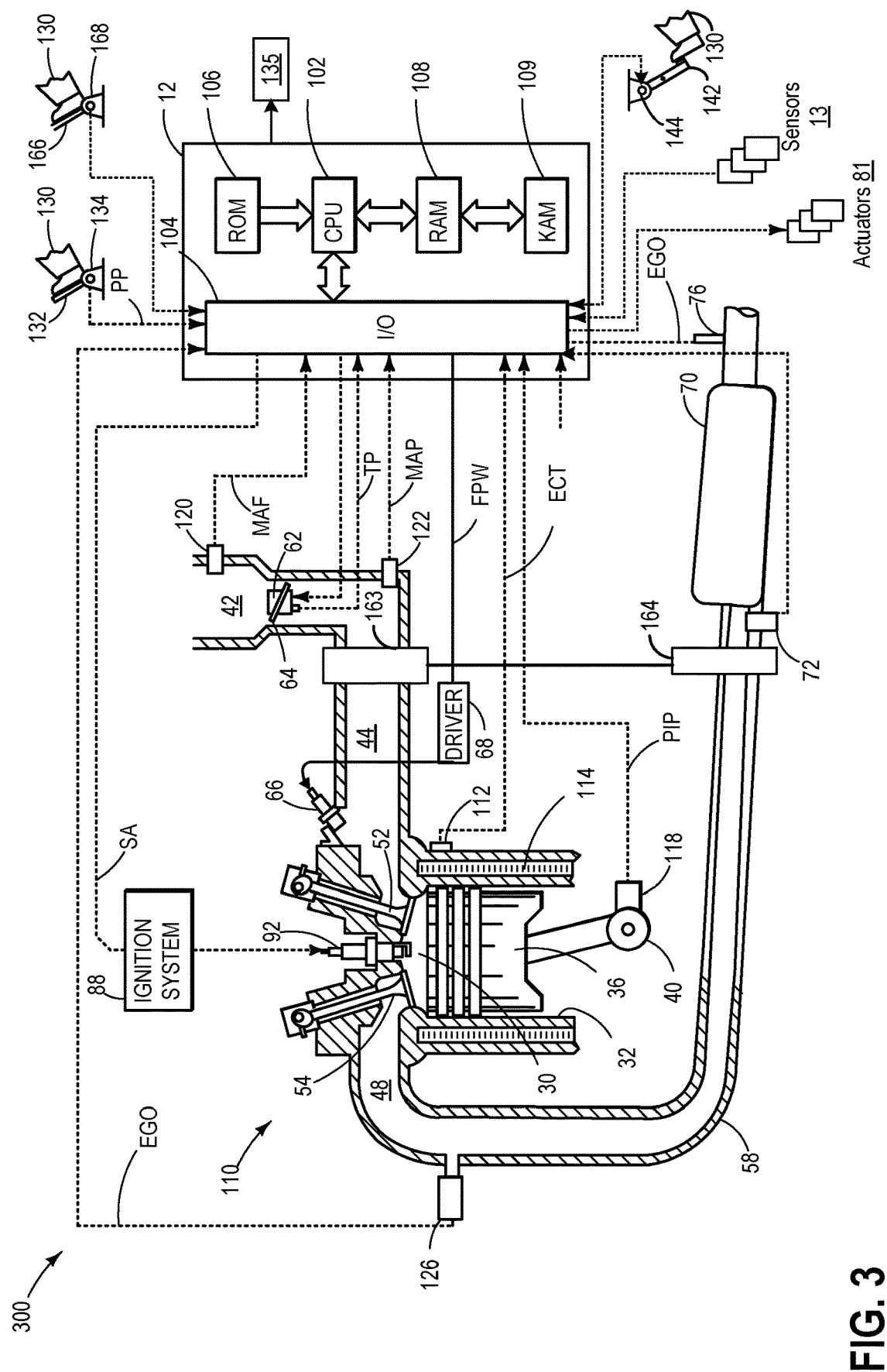
FIG. 3 is a schematic diagram of an engine of the vehicle systems of FIGS. 1-2, including a control system in electronic communication with a driver and an emission control device.

Turning to FIG. 3, a schematic diagram showing one cylinder of a multi-cylinder engine 10, which may be included in a propulsion system of a vehicle (such as vehicle 100 of FIG. 1 and/or vehicle 200 of FIG. 2) is shown. In one example, the engine 110 may be a six-cylinder engine, wherein three cylinders may form a first bank of cylinders and another three cylinders may from a second bank of cylinders. Each of the first bank of cylinders and the second bank of cylinders may be coupled to an exhaust system, as will be described below with reference to FIG. 3. Elements in common between FIGS. 1-3 are labeled similarly.

Engine 110 may be controlled at least partially by a control system including controller 12 and by input from the operator 130 via one or more input devices. In this example, an input device includes an accelerator pedal 132 and an accelerator pedal sensor 134 for generating a proportional pedal position signal PP. An input device also includes a clutch pedal 142 and a clutch pedal sensor 144 for generating a clutch pedal position. An input device also includes a brake pedal 166 and a brake pedal sensor 168 for generating a brake pedal position. Combustion chamber 30 of the engine 110 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 110.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an actuator included with throttle 62. In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. As an example, the controller may control a position of the throttle plate 64 based on one or more operating conditions. For example, the controller may adjust the throttle plate to allow more or less airflow to the engine 110 to maintain an idle speed set point based on one or more operating modes, such as operating the engine during a cold-start.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 110 may be operated in a compression ignition mode, with or without an ignition spark. As an example, the controller may adjust the SA based on one or more operating conditions. For example, the controller may adjust the SA to increase or decrease spark retard to maintain an idle speed set point based on one or more operating modes, such as operating the engine during a cold-start.

Exhaust gas sensor 126 is shown coupled to exhaust passage 58 upstream of an emission control device, such as exhaust catalyst 70. Exhaust gas sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust catalyst 70 is shown arranged along exhaust passage 58 downstream of exhaust gas sensor 126. Exhaust catalyst 70 may include a three-way catalyst (TWC), NOx trap, various other emission control devices, or combinations thereof. In some embodiments, during operation of engine 110, exhaust catalyst 70 may be periodically reset by operating at least one cylinder of the engine within a particular air/fuel ratio. Full-volume exhaust gas sensor 76 is shown coupled to exhaust passage 58 downstream of exhaust catalyst 70. Exhaust gas sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. As an example, the embodiment may include a mid-bed sensor to detect air-fuel ratio in the middle of the catalyst.

Other sensors 72 such as an air mass flow (AM) and/or a temperature sensor may be disposed upstream of exhaust catalyst 70 to monitor the AM and temperature of the exhaust gas entering the exhaust catalyst. The sensor locations shown in FIG. 3 are just one example of various possible configurations. For example, the emission control system may include a partial volume set-up with close-coupled catalysts.

In some examples, the emission control may produce cold-start emissions if the engine 110 performs operations that consume larger quantities of fuel, such as driving or reversing the vehicle, before the exhaust catalyst 70 heats to light-off temperature. Sensor 72 may signal an exhaust temperature to the controller 12. In one example, the controller 12 may use the exhaust temperature to estimate the temperature of the catalyst, for example, to provide an indication of estimated catalyst temperature to the driver, and/or to estimate catalyst warmup time. The controller may compare the signaled temperature to a temperature threshold. In one example, the threshold may be calibrated to the catalyst light-off temperature. If the sensor 72 detects an exhaust temperature less than the threshold, e.g., less than the light off temperature, the controller may operate a cold-start drive-away control mechanism, such described in FIGS. 1-2 (e.g., clutch pedal lock 143, gearshift lever lock 173, or clutch system 251). When the sensor 72 detects the exhaust catalyst 70 has warmed to catalyst light-off temperature a signal may be sent to the controller 12 to disable the cold-start drive-away control mechanism, for example by releasing the gearshift lever lock 173 or the clutch pedal lock 143 of FIG. 1 or by allowing the electric clutch actuator 287 to unlock the clutch.

Engine 110 may further include a compression device such as a turbocharger or supercharger including at least a compressor 163 arranged along intake manifold 44. For a turbocharger, compressor 163 may be at least partially driven by a turbine 164 (e.g., via a shaft) arranged along exhaust passage 58. For a supercharger, compressor 163 may be at least partially driven by the engine 110 and/or an electric machine, and may not include a turbine. Thus, the amount of compression provided to one or more cylinders of the engine via a turbocharger or supercharger may be varied by controller 12. In some embodiments, throttle 62 and MAP sensor 122 are downstream of compressor 163, and exhaust oxygen sensor 126 is downstream of the turbine 164.

Controller 12 is shown in FIG. 1 as a microcomputer, including microprocessor unit 102, input/output ports 104, an electronic storage medium for executable programs and calibration values shown as read-only memory 106 in this particular example, random access memory 108, keep alive memory 109, and a data bus. Controller 12 may receive various signals from sensors coupled to engine 110, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; air mass and/or temperature of the exhaust gas entering the catalyst from sensor 72; exhaust gas air-fuel ratio post-catalyst from exhaust gas sensor 76; and absolute manifold pressure signal, MAP, from manifold air pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a display device 135, for example to alert the operator 130 to various modes of operation and to deliver instructions Storage medium read-only memory 106 can be programmed with computer readable data representing instructions executable by microprocessor 102 for performing the methods described below as well as other variants that are anticipated but not specifically listed.

Control routines for a vehicle including a manual transmission (such as vehicle 100 of FIGS. 1-3) for preventing cold-start drive-away are illustrated in detail below with reference to FIGS. 4-7. In the present disclosure, the one or more control routines may include preventing drive-away until the light-off temperature of an exhaust catalyst (e.g., a TWC) is reached. In a first example, a method 400 controlling drive-away by mechanically locking in a neutral position a gearshift lever is illustrated in FIG. 4. In a second example, a method 500 controlling drive-away by mechanically locking a clutch in an open position via a driver clutch pedal lock is illustrated in FIG. 5. In a third example, a method 600 controlling drive-away using a clutch system with an electric actuator coupled to the clutch is illustrated in FIG. 6. An additional or alternative routine for idle speed control of an engine system is described in a method 700 of FIG. 7.

FIG. 4 shows the example method 400 that may control drive-away by locking in neutral the gearshift lever (such as gearshift lever 172 of FIG. 1) until warming of an exhaust catalyst above a threshold temperature is indicated (e.g., light-off temperature). Instructions for carrying out the method 400 and the other methods included herein may be executed by a controller based on instructions stored on a memory of the controller and in conjunction with signals received from sensors of the vehicle system, such as controller 12 and sensors 13 described above with reference to FIGS. 1-3. Further, the controller may employ actuators (e.g., actuators 81, gearshift lever lock 173 of FIG. 1) of the vehicle system to adjust operation of the manual transmission, according to the method 400 as described below.

At 402, the method 400 includes estimating and/or determining engine and vehicle operating conditions. Engine and vehicle operating conditions may include engine speed and load, vehicle speed, ambient temperature, ambient humidity, ambient pressure, MAF, a position of the throttle, a position of the clutch, a position of one or more driver pedals of the vehicle system, torque demand, exhaust catalyst temperature, duration (or distance) elapsed since last engine start, and so on.

At 404, the method 400 includes determining if the temperature of an exhaust catalyst (such as exhaust catalyst 70 in FIG. 3) is greater than a threshold temperature. The threshold temperature may be pre-calibrated based on the catalyst light-off temperature. Below the light-off temperature, the exhaust catalyst may not be able to effectively treat the reactive constituents of the exhaust gas. Catalyst temperature may also be inferred based on a lower than threshold engine temperature and/or ambient temperature upon engine start. Catalyst temperature may additionally or alternatively be inferred based on an estimate of exhaust gas temperature, such as indicated by one or more sensors of the vehicle system (e.g., sensors 13 of FIGS. 1-2, sensor 72 of FIG. 3). During a cold-start, the exhaust temperature is lower than the threshold temperature and may steadily increase during engine warming.

If it is determined that catalyst temperature is lower than the threshold temperature, the method 400 continues to 408. At 408, the method 400 includes locking the gearshift lever in neutral. In one example, an engine system may not start without the gearshift lever in neutral. Thus, following engine start and upon determining the catalyst temperature less than the threshold temperature, the controller may actuate the gearshift lever lock (e.g., lock 173 of FIG. 1) preventing driver operation of the gearshift lever and maintaining the vehicle in neutral. From 408, the method includes returning to 404 to determine if the catalyst temperature is less than the threshold temperature, for example by monitoring signals received from the one or more sensors of the vehicle system.

Once it is determined that the catalyst temperature is greater than the threshold temperature, the method 400 continues to 406. If it is determined that the catalyst temperature is greater than the threshold temperature, it may be inferred that the exhaust passage is sufficiently heated and the catalyst light-off has been attained. Upon catalyst light-off, the exhaust catalyst may treat a sufficient amount of exhaust gas before it exits through the tailpipe. Therefore, at 406, the driver may be informed of the catalyst light-off and gearshift lever unlocked (e.g., by actuating gearshift lever lock 173). Upon unlocking of the gearshift lever, the gearshift lever is operable and responsive to driver input. The method ends.

Turning now to FIG. 5, a method 500 is shown. The method 500 describes a controller routine to prevent cold-start drive-away by locking in a depressed position the clutch pedal (such as clutch pedal 142 of FIG. 1) until warming of an exhaust catalyst above a threshold temperature is indicated.

At 502, the method 500 includes estimating and/or determining engine and vehicle operating conditions. Engine and vehicle operating conditions may include engine speed and load, vehicle speed, ambient temperature, ambient humidity, ambient pressure, MAF, a position of the throttle, a position of the clutch, a position of one or more driver pedals of the vehicle system, torque demand, exhaust catalyst temperature, duration (or distance) elapsed since last engine start, etc.

At 504, the method 500 includes determining if the temperature of an exhaust catalyst (e.g. exhaust catalyst 70 in FIG. 3) is greater than a threshold temperature. The threshold temperature may be pre-calibrated based on the catalyst light-off temperature. Below the light-off temperature, the exhaust catalyst may not be able to effectively treat the reactive constituents of the exhaust gas. Catalyst temperature may also be inferred based on a lower than threshold engine temperature and/or ambient temperature upon engine start. Catalyst temperature may additionally or alternatively be inferred based on an estimate of exhaust gas temperature, such as indicated by one or more sensors of the vehicle system (e.g., sensors 13 of FIGS. 1-2, sensor 72 of FIG. 3).

If it is determined that catalyst temperature is lower than the threshold temperature, the method 500 continues to 508. At 508, the method 500 includes locking the clutch pedal in a depressed position. In one example, an engine system may request the driver depress the clutch pedal to allow engine start. Once the clutch pedal is depressed, the clutch pedal may be locked in the depressed position. Following engine start and upon determining the catalyst temperature is less than the threshold temperature, with the clutch pedal depressed the controller may actuate a clutch pedal lock (e.g., lock 143 of FIG. 1) preventing driver operation of the clutch. In one example, a clutch pedal lock may hold the clutch pedal in the depressed position using an electrically controlled latch mechanism. From 508, the method includes returning to 504 to determine if the catalyst temperature is less than the threshold temperature, for example by monitoring signals received from the one or more sensors of the vehicle system.

Once it is determined that the catalyst temperature is greater than the threshold temperature, the method 500 continues to 506. If it is determined that the catalyst temperature is greater than the threshold temperature, it may be inferred that the exhaust passage is sufficiently heated to completely treat the exhaust gas before it exits through the tailpipe. To prevent undesired and/or unexpected vehicle acceleration, at 506, the driver may be informed of the catalyst light-off and the wheel brakes engaged before driver input control is restored. The driver may be instructed to further depress the clutch pedal to restore driver input control.

At 510, the method 500 includes determining if clutch pedal position is greater than a threshold position. If pedal position greater than the threshold position is not detected, the driver may continue to be instructed to depress the clutch pedal to release the lock. Upon detection of clutch pedal pressure greater than the threshold pressure, the method 500 continues to 512.

At 512, the method 500 includes disengaging the wheel brakes. If the driver is depressing the brake pedal, the wheel brakes may remain engaged.

At 514, the method 500 includes releasing the lock on the clutch pedal. In one example, the driver depressing the clutch pedal actuates the release of a latch on the clutch pedal lock. In another example, a sensor may be used to determine if the driver has moved the clutch pedal (e.g., to hold it in a disengaged position) beyond a threshold position before the lock is electronically released. The sensor may be a position sensor (e.g. linear displacement sensor) to tell whether the pedal is depressed further than the latch position of the lock, indicating that the clutch pedal is held in the depressed position by the driver instead of resting against the latch mechanism.

Turning now to FIG. 6, a method 600 is shown. The method 600 describes a routine to control cold-start driveaway by preventing clutch engagement until warming of an exhaust catalyst above a threshold temperature is indicated. In one example, the method 600 may be executed by a control system to operate a clutch system including an electric actuator coupled to the clutch (e.g., controller 12 and clutch system 251 of FIG. 2). In one example, with the clutch system, the position of the clutch pedal is monitored by sensors and an electromechanical actuator is used to remotely operate the clutch (e.g., clutch sensor 249, clutch pedal sensor 144, electric clutch actuator 287 of FIG. 2). Thus, until the exhaust catalyst reaches full efficiency, driver clutch pedal input may be disregarded by the control system. Once the catalyst reaches light-off temperature, the driver may be informed and driver input control restored following an indication of driver engagement.

At 602, the method 600 includes estimating and/or determining engine and vehicle operating conditions. Engine and vehicle operating conditions may include engine speed and load, vehicle speed, ambient temperature, ambient humidity, ambient pressure, MAF, a position of the throttle, a position of the clutch, a position of one or more driver pedals of the vehicle system, torque demand, exhaust catalyst temperature, duration (or distance) elapsed since last engine start, etc.

At 604, the method 600 includes determining if the temperature of an exhaust catalyst (e.g., exhaust catalyst 70 in FIG. 3) is greater than a threshold temperature. The threshold temperature may be pre-calibrated based on the catalyst light-off temperature. Catalyst temperature may also be inferred based on a lower than threshold engine temperature and/or ambient temperature upon engine start. Catalyst temperature may additionally or alternatively be inferred based on an estimate of exhaust gas temperature, such as indicated by one or more sensors of the vehicle system (e.g., sensors 13 of FIGS. 1-2, sensor 72 of FIG. 3).

If it is determined that catalyst temperature is lower than the threshold temperature, the method 600 continues to 608. At 608, the method 600 includes preventing clutch engagement. In one example, the clutch system may be operated by the control system for engaging and disengaging the clutch of the vehicle system. Following engine start and upon determining the catalyst temperature is less than the threshold temperature, driver input may be disregarded by the control system. For example, the controller may not respond to the driver clutch pedal sensor detecting the depressed clutch pedal. From 608, the method includes returning to 604 to determine if the catalyst temperature is less than the threshold temperature, for example by monitoring signals received from the one or more sensors of the vehicle system.

Once it is determined that the catalyst temperature is greater than the threshold temperature, the method 600 continues to 606. If it is determined that the catalyst temperature is greater than the threshold temperature, it may be inferred that the exhaust passage is sufficiently heated to completely treat the exhaust gas before it exits through the tailpipe. To prevent vehicle acceleration, at 606, the driver may be informed of the catalyst light-off and the wheel brakes engaged before driver input control is restored. The driver may be instructed to further depress the clutch pedal to restore driver input control.

At 610, the method 600 includes determining if clutch pedal position is greater than a threshold position. In one example, the clutch pedal sensor may be used to determine if the driver has moved the clutch pedal past a threshold position to indicate driver awareness, before the clutch is electronically engaged. If pedal position greater than the threshold position is not detected, the driver may continue to be instructed to apply pressure to the clutch pedal to release the lock. Upon detection of clutch pedal position greater than the threshold position, the method 600 continues to 612.

At 612, the method 600 includes releasing the wheel brakes. If the driver is depressing the brake pedal, the wheel brakes may remain engaged.

At 614, the method 600 includes gradually engaging the clutch as the driver releases the clutch pedal.

FIG. 7 illustrates a method 700 for controlling engine speed to a desired engine speed during idling (e.g., idle speed control) based on one or more operating conditions, such as a cold start. As an example, a control system (e.g., controller 12 of FIGS. 1-3) may control an engine in a first idle speed control mode (e.g., during a cold start), where an engine idle speed set point is maintained to produce heat for warming an exhaust catalyst with low cumulative emissions. As another example, the control system may control the engine in a second idle speed control mode (e.g., after catalyst warming), where the engine idle speed set point is reduced to a speed that reduces fuel consumption while avoiding undesirable occurrences during an idle condition, e.g., misfire, engine stall, noise, vibration, harshness (NVH). As an example, the control system may adjust one or more feedback control parameters to maintain the desired engine idle speed set point for a given mode, for example by adjusting controller gains using a proportional integral derivative (PID) controller. As an example, the PID controller may calculate an error value representing a deviation from the idle speed set point (e.g., obtained via one or more sensors) and apply corrections based on a controller gain setting to maintain the set point. Feedback control for a given mode may involve not only different values for controller gains, e.g., proportional gains, integral gains, but also different architectures and actuators. For example, cold start idle speed control may adjust the throttle and idle speed control may adjust the throttle and the spark retard to maintain idle speed.

At 702, the method 700 determines a mode of speed control, such as cold-start idle speed control. At 704, the method includes determining if cold-start conditions are met. Cold-start conditions may be inferred based on concurrent operation of a cold-mode drive-away control mechanism, such as described in method 400, 500, or 600 of FIGS. 4-6. Additionally or alternatively, cold-start conditions may include the controller detecting one or more of a lower than threshold temperature of an exhaust catalyst (such as exhaust catalyst 70 in FIG. 3), a lower than threshold engine temperature, a lower than threshold ambient temperature upon engine start, or a lower than threshold exhaust temperature. Temperature thresholds may be calibrated to the exhaust catalyst light-off temperature. Exhaust catalyst temperature may be estimated by one or more of the sensors in the vehicle system, such as exhaust gas sensor 72 of FIG. 3.

If it is determined that cold-start conditions are met, the method continues to 706. At 706, the vehicle system transitions to a first mode of idle speed control, e.g., cold-start idle speed control. While the engine is in cold-start idle speed control, the control system refrains from responding to driver pedal input. For example, if the driver applies pressure to an accelerator pedal (e.g., a tip-in), the controller may not adjust a position of a throttle plate (e.g., throttle plate 64 of FIG. 3) to increase air flow to the engine in response. As another example, the controller may not exit idle speed control in response to a pedal position. In cold-start idle speed control, the controller may ignore the driver torque demand and maintain idle speed control.

In one example, cold-start idle speed control operates in tandem with a cold-start drive-away control mechanism, (e.g., a locked condition), such as the locked clutch pedal, locked gearshift lever, or disengaged actuator of the clutch system described in FIGS. 4-6. The control system may control the engine idle speed by adjusting feedback control parameters. For example, a first feedback control parameter (e.g. feedback control gains) may be adjusted during cold-start control. At 706*a*, the method 700 includes setting feedback control gains based on the locked condition. For example, the feedback control gains for one or more tuning parameters of the PID controller may be set to a first level, such as set to a first proportional or integral gain, (e.g., more or less aggressive), when the controller does not need to anticipate driver disturbance such as a torque request.

At 706*b*, the method includes determining an idle speed set point based on one or more operating conditions. As a general example, the idle speed set point may set based on at least engine temperature. For example, the idle speed set point may be set to a first level (e.g., a higher engine speed) when the engine is cooler than a threshold temperature indicating the vehicle is in the cold-start drive-away control condition. For example, the cold-start idle speed set point may be calibrated to most efficiently warm the exhaust catalyst with the lowest cumulative emissions. The cold-start idle speed set point may be based on an engine speed setting profile, which may depend on operating conditions such as the ambient temperature, refraining from driver input, etc. As another example, the idle speed set point may change during exhaust catalyst warmup. For example, the set point may be set to a first, e.g., highest speed, and reduced as sensor feedback indicates exhaust catalyst (e.g., exhaust catalyst 70 in FIG. 1-3) warming. The controller may adjust the idle speed set point to a different level when the vehicle is no longer in cold-start idle speed control, for example, when the controller is responsive to driver input.

At 706*c*, the method includes adjusting engine torque to idle speed responsive to speed error using the controller gains. As an example, the controller may adjust ignition spark timing to produce greater heat to warm the exhaust catalyst. For example, the controller may increase spark retard during cold-start idle speed control and make further adjustments to the spark timing based on feedback control. As another example, the controller may adjust air flow to the engine to produce greater heat. In an example, the controller may adjust the throttle plate (e.g., throttle plate 64 of FIG. 3) to allow a greater or lesser amount of airflow to the combustion chambers of the engine based on feedback control. In this way, the idle speed control is maintained during a cold start.

Returning to 704, if it is determined that cold-start conditions are absent, the method continues to 708. At 708, the control system transitions to a second mode of idle speed control that is interruptible by pedal position. For example, if the driver adjusts the position of an accelerator pedal (e.g., a tip-in), the control system may adjust the position of the throttle plate (e.g., throttle plate 64 of FIG. 3) to increase air flow to the engine in response. As another example, the controller may exit idle speed control in response to pedal position.

In an example, with cold-start conditions absent, the clutch pedal lock, clutch lever lock and/or clutch system (described in FIGS. 4-6) are deactivated such that the vehicle is in an unlocked condition and idle speed control is responsive to driver input. Engine idle speed may be maintained by adjusting a second feedback control parameter (e.g., controller gains) different from the first. Engine idle speed may be maintained by adjusting different actuators, for example, by adjusting the throttle and spark retard.

At 708*a*, the method 700 includes setting feedback control gains based on the unlocked condition. For example, the feedback control gains for one or more tuning parameters of the PID controller may be set to a second level, such as set to a second, different than the first, proportional or integral gain (e.g., more or less conservative), when the controller may anticipate driver disturbances such as clutch engagement, gear shift, throttle demand, etc.

At 708*b*, the method includes determining an idle speed set point based on one or more operating conditions. As a general example, the idle speed set point may set to a second level (e.g., a lower engine speed) when the vehicle is responsive to driver input. For example, the cold-start idle speed set point may be calibrated to run at a low RPM, to reduce fuel consumption. The idle speed set point may be based on an engine speed setting profile, which may depend on conditions such as an ambient temperature, an ambient air pressure, a status of power-consuming accessories, etc.

At 708*c*, the method includes adjusting engine torque to idle speed responsive to speed error using the controller gains. As an example, the controller may adjust ignition spark timing to reduce a likelihood of misfire and reduce fuel consumption. For example, the controller may reduce spark retard after exiting cold-start idle speed control and make further adjustments to the spark timing based on feedback control. As another example, the controller may operate to adjust the idle speed set point to respond to driver disturbances following reaching light-off temperature.

At 708*d*, the method includes determining a pedal position. As an example, the control system uses feedback from various sensors of the system and controller gains to enter idle speed control, to maintain the engine speed at the idle speed set point, and to determine when to exit idle speed control. At 708*e*, the method includes transitioning out of idle speed control if the pedal position is greater than a threshold position. In an example, the threshold may be a non-zero preset threshold position. For example, a driver tip-in of the accelerator pedal past the threshold position as read by a pedal position sensor may indicate to the control system a request to exit idle speed control. At 708f, the method includes transitioning into or maintaining idle speed control if the pedal position is less than the threshold position. For example, if the accelerator pedal sensor detects a driver tip-out of the accelerator pedal past the threshold position, the control system may control the engine in idle speed control. In this way, idle speed control is maintained responsive to driver input.

FIG. 8 shows an example timing diagram 800 illustrating cold-start drive-away control in a manual vehicle using a clutch locking mechanism and idle speed control of the engine system. As one example, the clutch locking mechanism may be the same or similar to the clutch system 251 of the vehicle 100 in FIG. 1. Additionally or alternatively, the gearshift lever lock 173 or clutch pedal lock 143 of the vehicle 100 in FIG. 1 could be used to prevent cold-start drive-away in a similar example timeline. Idle speed control may be maintained by a control system using sensor feedback to adjust actuators of the engine system, such as the controller 12, engine 110, actuators 81, and sensors 13 described in FIGS. 1-3. Instructions for performing cold-start drive-away control described in the timing diagram 800 may be executed by the controller (e.g., controller 12 in FIG. 1-3) based on instructions stored on a memory of the controller and in conjunction with signals received from the sensors of the vehicle system, such as sensors 13 of vehicle 100 described FIGS. 1-3. The horizontal axis (x-axis) denotes time and the vertical markers t0-t5 identify relevant times in the method 600 and method 700 of FIGS. 6 and 7, respectively, to prevent cold-start drive-away.

Timing diagram 800 shows plots 802, 804, 806, 810, 812, 814, and 816, which illustrate states of components and/or operating conditions of the vehicle system over time. Plot 802 indicates a temperature estimate of an exhaust catalyst (e.g., exhaust catalyst 70 of FIG. 1-3). As an example, plot 802 represents a temperature range starting at ambient (A) and increasing upwards along the y-axis. In one example, the temperature of the exhaust catalyst may be estimated from a sensor reading of an exhaust gas temperature. Dashed line 801 denotes a threshold exhaust catalyst temperature above which light-off of the exhaust emissions control device is attained and cold-start drive-away control is not desired (e.g., 300° C.). Plot 804 indicates an engine speed. In one example, the controller may determine a first threshold engine speed 803 and a second threshold engine speed 805. In one example, the first threshold engine speed 803 is an idle speed set point calibrated to produce engine heat to warm the exhaust catalyst during a cold start and to ignore driver input (e.g., 1000 RPM). In one example, the second threshold engine speed 805 is an idle speed set point calibrated to run at a lower RPM, reduce fuel consumption, and be responsive to driver torque request (e.g., 600 RPM). Plot 806 indicates a mode of idle speed controller gain. As an example, plot 806 may include adjustments to a proportional control parameter of a PID controller and/or an integral control parameter of a PID controller, etc. The mode settings may include the same or different settings for one or more actuators for maintenance of the set point. For example, multiple actuators may be used at the same time as part of idle speed control (e.g., throttle & spark) and multiple gains: spark proportional gain, throttle proportional gain, throttle integral gain. Depending on mode, one or more gain settings may change, e.g., either increase or decrease. Plot 810 indicates a driver gas pedal position. For example, the plot increasing upwards along the y-axis indicates a driver torque request via the gas pedal (e.g., a driver tip-in) read by a gas pedal sensor. Plot 812 indicates a driver clutch pedal position. For example, the plot increasing upwards along the y-axis indicates a driver requesting clutch disengagement. Plot 814 indicates an actual position of the clutch. For example, the plot increasing upwards along the y-axis indicates actual clutch disengagement. Plot 816 indicates a position of wheel brakes, which may be engaged (E) or disengaged (D).

Plots 802, 804, 806, 810, 812, 814, and 816 illustrate states of the above mentioned components and/or operating conditions of the vehicle system across five durations: a first duration from time t0 to t1; a second duration from time t1 to t2, a third duration from time t2 to t3; a fourth duration from t3 to t4; and a further duration from t4 to t5.

Prior to time t1, the engine is at rest and the vehicle is not propelled via engine torque. The temperature of the exhaust catalyst is at ambient. The engine speed is 0, driver input to the gas pedal is not detected, and the clutch pedal is depressed. The clutch and wheel brakes are not engaged.

At time t1, the engine starts from rest. Due to the catalyst temperature being below the threshold temperature, cold-start drive-away control is desired. Therefore, at t1, the clutch system prevents clutch engagement irrespective of driver pedal input and cold-start idle speed control is implemented. Based on the ambient temperature and duration of time since last engine start, the controller determines the first threshold engine speed 803 is the cold-start idle speed set point. The controller adjusts controller gains 806 based on the locked condition.

At time t1, the engine speed is below the idle speed set point. Therefore, from time t1 to t2, the control system adjusts engine torque to the idle speed responsive to speed error using the controller gains. From t1 to t2, the engine is producing heat and the catalyst temperature increases in response.

Starting at time t2, the driver releases the clutch pedal 812 to move the car. From t2 to t3, with the clutch pedal released, the driver steps on the gas pedal 810 to request torque. Due to cold-start drive-away control being implemented, the clutch system does not actuate the clutch in response. Thus, the actual clutch position 814 does not change (remains disengaged). Driver input is ignored and idle speed control is maintained. The driver reduces and ceases to depress the gas pedal before t3. From t2 to t3, the controller maintains engine speed at the idle speed set point by continuously adjusting engine torque using feedback control. The exhaust catalyst temperature increases.

At time t3, the exhaust catalyst temperature increases above the threshold 801 and it is inferred that cold-start drive-away control is not desired, e.g., controller may actuate the clutch responsive to driver input. The driver is informed that the exhaust catalyst light-off temperature is reached and the wheel brakes 816 are engaged. The idle speed controller mode 806 is adjusted with gain levels pre-calibrated for driver input responsiveness. The driver is further informed that the wheel brakes will be disengaged following the driver depressing the clutch pedal.

The control system determines clutch pedal is not depressed, therefore the control system transitions to idle speed control interruptible by pedal position. The control system determines the second threshold engine speed 805 is the idle speed set point.

From t3 to t4, the wheel brakes 816 remain engaged due to the control system not detecting the depressed clutch pedal. The control system adjusts engine torque to the idle speed set point 805 responsive to speed error using controller gains.

At t4, the control system detects the driver depressing the clutch pedal. In response, the control system disengages the wheel brakes. From t4 to t5, the clutch is engaged as the driver releases the clutch pedal and depresses the gas pedal to accelerate, taking the vehicle out of idle speed control.

In example timeline 800, light-off temperature determines a transition from the first threshold engine speed to the second threshold engine speed. In an additional or alternative example, the speed set point may be varied with time or catalyst temperature. For example, the set point may be 1200 RPM initially and then gradually reduced to 600 RPM as light-off temperature is reached.

In this way, by locking a gearshift lever in neutral, locking a clutch pedal in a depressed position, or by disengaging a clutch of a clutch system, a manual vehicle may be controlled to prevent cold-start drive-away. In some examples, the control system may adjust an engine speed to a desired speed during idling before catalyst warming is indicated based on one or more operating conditions. For example, the control system may determine an idle speed set point based on one or more conditions such as cold start, ambient temperature, etc., to produce heat to warm the catalyst. The control system may adjust parameters of controller gain based on the cold-start and/or other conditions. The control system may retard spark to increase exhaust heat. Once catalyst light-off temperature is reached, the driver may be informed and operator control of the vehicle restored. The control system may operate the vehicle with alternative idle speed control settings upon reaching light-off temperature based on one or more other operating condition. In some examples, the control system may restore operator control upon receiving an indication from the driver, e.g., the driver applying pressure to the clutch. The technical effect of preventing cold-start drive-away is improving emissions quality.

The disclosure also provides support for a method for a vehicle with a driver clutch pedal, comprising: preventing one of a clutch coupled between an input of a transmission and an engine output from closing and a driver-operated gearshift lever for adjusting a gear of the transmission from coming out of neutral in response to a catalyst light-off condition. In a first example of the method, the clutch is not coupled to a driver-operated clutch pedal and an electric or hydraulic actuator is coupled to the clutch, the electric or hydraulic actuator adjusted to follow the driver-operated clutch pedal after reaching catalyst light-off. In a second example of the method, optionally including the first example, preventing the clutch coupled between the input of the transmission and the engine output from closing includes engaging a clutch lock to lock the clutch in an open position until after reaching catalyst light-off. In a third example of the method, optionally including one or both of the first and second examples, preventing the driver-operated gearshift lever coupled to the transmission from coming out of neutral includes engaging a gearshift lever lock to lock the gearshift lever in neutral until after reaching catalyst light-off. In a fourth example of the method, optionally including one or more or each of the first through third examples, the method further comprises: controlling engine speed to a desired engine speed during idling before reaching catalyst light-off with a first feedback control parameter, and controlling engine speed to the desired engine speed during idling after reaching catalyst light-off with a second feedback control parameter different from the first. In a fifth example of the method, optionally including one or more or each of the first through fourth examples, the desired engine speed during idling is set based on at least engine temperature. In a sixth example of the method, optionally including one or more or each of the first through fifth examples, the desired engine speed during idling is reduced after reaching catalyst light-off as compared with before reaching catalyst light-off, and wherein feedback is gradually adjusted from the first feedback control parameter to the second feedback control parameter, and wherein the desired engine speed during idling is gradually changed when transitioning around catalyst light-off. In a seventh example of the method, optionally including one or more or each of the first through sixth examples, the first feedback control parameter is a first proportional or integral gain and the second feedback control parameter is a second, different, proportional or integral gain. In an eighth example of the method, optionally including one or more or each of the first through seventh examples, the method further comprises: actuating wheel brakes of the vehicle based on the catalyst light-off condition. In a ninth example of the method, optionally including one or more or each of the first through eighth examples, the method further comprises: indicating once catalyst light-off has been reached. In a tenth example of the method, optionally including one or more or each of the first through ninth examples, the indication is provided to a vehicle occupant via a vehicle interface. In a eleventh example of the method, optionally including one or more or each of the first through tenth examples, the indication is provided to a mobile device via a vehicle communication system. In a twelfth example of the method, optionally including one or more or each of the first through eleventh examples, the method further comprises: providing an indication of estimated catalyst temperature. In a thirteenth example of the method, optionally including one or more or each of the first through twelfth examples, the indication is provided to a mobile device, the method further comprising providing an indication of clutch lock-out status to the mobile device.

The disclosure also provides support for a vehicle system, comprising: a transmission, a prime mover, a clutch coupled between the transmission and the prime mover, a driver clutch pedal, a driver-operated gearshift lever for adjusting a gear of the transmission, and a control system with instructions that when executed prevents the clutch from closing and prevents the driver-operated gearshift lever from coming out of neutral in response to a catalyst light-off condition. In a first example of the system, the system further comprises: at least one of a clutch lock to lock the clutch in an open position and a gearshift lever lock to lock the gearshift lever in neutral. In a second example of the system, optionally including the first example, the control system further comprises instructions that when executed control engine speed to a desired engine speed during idling before reaching catalyst light-off with a first feedback control parameter, and control engine speed to the desired engine speed during idling after reaching catalyst light-off with a second feedback control parameter different from the first. In a third example of the system, optionally including one or both of the first and second examples, the first feedback control parameter is a first proportional gain and the second feedback control parameter is a second, lower than the first, proportional gain.

The disclosure also provides support for a method for a vehicle with a driver clutch pedal, comprising: preventing one of a clutch coupled between an input of a transmission and an engine output from closing and a driver-operated gearshift lever for adjusting a gear of the transmission from coming out of neutral in response to a catalyst light-off condition, and controlling engine speed to a desired engine speed during idling before reaching catalyst light-off with a first feedback control parameter having a higher gain, and controlling engine speed to the desired engine speed during idling after reaching catalyst light-off with a second feedback control parameter having a lower gain. In a first example of the method, the first feedback control parameter is a proportional gain.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with a driver clutch pedal, comprising:
    preventing one of a clutch coupled between an input of a transmission and an engine output from closing and a driver-operated gearshift lever for adjusting a gear of the transmission from coming out of neutral in response to a catalyst light-off condition.

2. The method of claim 1 wherein the clutch is not coupled to a driver-operated clutch pedal and an electric or hydraulic actuator is coupled to the clutch, the electric or hydraulic actuator adjusted to follow the driver-operated clutch pedal after reaching catalyst light-off.

3. The method of claim 1 wherein preventing the clutch coupled between the input of the transmission and the engine output from closing includes engaging a clutch lock to lock the clutch in an open position until after reaching catalyst light-off.

4. The method of claim 1 wherein preventing the driver-operated gearshift lever coupled to the transmission from coming out of neutral includes engaging a gearshift lever lock to lock the gearshift lever in neutral until after reaching catalyst light-off.

5. The method of claim 1 further comprising controlling engine speed to a desired engine speed during idling before reaching catalyst light-off with a first feedback control parameter, and controlling engine speed to the desired engine speed during idling after reaching catalyst light-off with a second feedback control parameter different from the first.

6. The method of claim 5 wherein the desired engine speed during idling is set based on at least engine temperature.

7. The method of claim 6 wherein the desired engine speed during idling is reduced after reaching catalyst light-off as compared with before reaching catalyst light-off, and wherein feedback is gradually adjusted from the first feedback control parameter to the second feedback control parameter gradually, and wherein the desired engine speed during idling is gradually changed when transitioning around catalyst light-off.

8. The method of claim 7 wherein the first feedback control parameter is a first proportional or integral gain and the second feedback control parameter is a second, different, proportional or integral gain.

9. The method of claim 1 further comprising actuating wheel brakes of the vehicle based on the catalyst light-off condition.

10. The method of claim 9, further comprising indicating once catalyst light-off has been reached.

11. The method of claim 10, wherein the indication is provided to a vehicle occupant via a vehicle interface.

12. The method of claim 10, wherein the indication is provided to a mobile device via a vehicle communication system.

13. The method of claim 1, further comprising providing an indication of estimated catalyst temperature.

14. The method of claim 13, wherein the indication is provided to a mobile device, the method further comprising providing an indication of clutch lock-out status to the mobile device.

15. A vehicle system, comprising:
a transmission;
a prime mover;
a clutch coupled between the transmission and the prime mover;
a driver clutch pedal;
a driver-operated gearshift lever for adjusting a gear of the transmission; and
a control system with instructions that when executed prevents the clutch from closing and prevents the driver-operated gearshift lever from coming out of neutral in response to a catalyst light-off condition.

16. The vehicle system of claim 15 further comprising at least one of a clutch lock to lock the clutch in an open position and a gearshift lever lock to lock the gearshift lever in neutral.

17. The vehicle system of claim 15 wherein the control system further comprises instructions that when executed control engine speed to a desired engine speed during idling before reaching catalyst light-off with a first feedback control parameter, and control engine speed to the desired engine speed during idling after reaching catalyst light-off with a second feedback control parameter different from the first.

18. The vehicle system of claim 17 wherein the first feedback control parameter is a first proportional gain and the second feedback control parameter is a second, lower than the first, proportional gain.

19. A method for a vehicle with a driver clutch pedal, comprising:
preventing one of a clutch coupled between an input of a transmission and an engine output from closing and a driver-operated gearshift lever for adjusting a gear of the transmission from coming out of neutral in response to a catalyst light-off condition; and
controlling engine speed to a desired engine speed during idling before reaching catalyst light-off with a first feedback control parameter having a higher gain, and controlling engine speed to the desired engine speed during idling after reaching catalyst light-off with a second feedback control parameter having a lower gain.

20. The method of claim 19 wherein the first feedback control parameter is a proportional gain.

\* \* \* \* \*